(12) United States Patent
Cheng et al.

(10) Patent No.: US 11,151,597 B2
(45) Date of Patent: *Oct. 19, 2021

(54) INTERRUPTION POINT DETERMINATION

(71) Applicant: INTERNATIONAL BUSINESS MACHINES CORPORATION, Armonk, NY (US)

(72) Inventors: Jen Ping Cheng, Taipei (TW); Chao Yuan Huang, Taipei (TW); Yen Lin Li, Taipei (TW); Lin Chung Liang, New Taipei (TW); Po Chun Lin, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/734,382

(22) Filed: Jan. 5, 2020

(65) Prior Publication Data

US 2020/0143412 A1    May 7, 2020

Related U.S. Application Data

(63) Continuation of application No. 15/725,370, filed on Oct. 5, 2017, now Pat. No. 10,552,862.

(51) Int. Cl.
*H04N 7/10* (2006.01)
*H04N 7/025* (2006.01)
*G06Q 30/02* (2012.01)

(52) U.S. Cl.
CPC ......... *G06Q 30/0241* (2013.01); *G06Q 30/02* (2013.01); *G06Q 30/0264* (2013.01); *G06Q 30/0269* (2013.01)

(58) Field of Classification Search
CPC ......... H04N 21/23424; H04N 21/2668; H04N 21/458; H04N 21/812; G06Q 30/0241; G06Q 30/02; G06Q 30/0264; G06Q 30/0269
See application file for complete search history.

(56) References Cited

U.S. PATENT DOCUMENTS

| | | | |
|---|---|---|---|
| 6,820,277 | B1 | 11/2004 | Eldering |
| 9,426,538 | B2 | 8/2016 | Byers |
| 9,497,507 | B2 | 11/2016 | Bhat |
| 2009/0226046 | A1* | 9/2009 | Shteyn ............. H04N 21/26603 382/118 |
| 2010/0205049 | A1 | 8/2010 | Long |
| 2012/0143693 | A1 | 6/2012 | Chung |
| 2014/0096152 | A1 | 4/2014 | Ferens |

(Continued)

OTHER PUBLICATIONS

Google, "Cloud Vision API", https:1/cloud.google.com/vision/, accessed on Sep. 27, 2017, pp. 1-8.

(Continued)

*Primary Examiner* — Mulugeta Mengesha
(74) *Attorney, Agent, or Firm* — Michael O'Keefe

(57) ABSTRACT

The present disclosure provides a method, computer system and computer program product for determining interruption points based on emotion values in a content. According to the method, emotion values of one or more emotion catalogs at one or more time points of the content to be interrupted can be determined, and one or more interruption points can be determined based on the determined emotion values.

16 Claims, 6 Drawing Sheets

(56) References Cited

U.S. PATENT DOCUMENTS

2015/0181291 A1* 6/2015 Wheatley ............... H04N 21/84
                                                              725/10
2015/0317699 A1   11/2015 Tian
2016/0148055 A1    5/2016 Zilberstein
2019/0108550 A1    4/2019 Cheng

OTHER PUBLICATIONS

IBM, "Tone Analyzer", https:/ltone-analyzer-demo.mybluemix.net/, accessed on Sep. 27, 2017, 1 page.

Kwon et al., "A Framework of Human Emotion Prediction Based on a Multi-Dimensional Emotion Model", Proceedings of the 7th International Conference on Information Security and Assurance (ISA 2013), Apr. 26-28, 2013, ASTL vol. 21, pp. 171-174.

Mell et al., "The NIST Definition of Cloud Computing", National Institute of Standards and Technology, Special Publication 800-145, Sep. 2011, 7 pages.

Yadati et al., "CAWA: Computational Affective Video-in-Video Advertising", IEEE Transactions on Multimedia, vol. 16, No. 1, Jan. 2014, pp. 15-23.

IBM: List of IBM Patents or Patent Applications Treated as Related (Appendix P), Mar. 11, 2020, pp. 1-2.

* cited by examiner

INTERRUPTION POINT DETERMINATION

BACKGROUND

The present invention relates to media processing technology, and more specifically, to determining interruption points based on emotion values.

Nowadays, many different content providers are providing different types of content viewing services to users. When the contents are viewed by the users, the contents can be interrupted and another content can be inserted and shown to the users.

However, it is difficult to determine the interruption points for the insertion. A bad interruption point may cause or increase dislike of the users to the content providers and/or advertisers. In some cases, the bad interruption points may even cause the users to give up the viewing or to switch to another content provider.

SUMMARY

According to one embodiment of the present invention, there is provided a computer-implemented method for determining interruption points based on emotion values of a content. According to the method, emotion values of one or more emotion catalogs at one or more time points of a content can be determined, and one or more interruption points can be determined based on the determined emotion values.

According to another embodiment of the present invention, there is provided a computer system for determining interruption points based on emotion values of a content. The system comprises one or more processors, a memory coupled to at least one of the one or more processors and a set of computer program instructions stored in the memory and executed by at least one of the one or more processors in order to perform some actions. The actions comprise: determining emotion values of one or more emotion catalogs at one or more time points of a content; and determining one or more interruption points based on the determined emotion values.

According to another embodiment of the present invention, there is provided a computer program product for determining interruption points based on emotion values of a content. The computer program product comprises a computer readable storage medium having program instructions embodied therewith, the program instructions executable by a processor to cause the processor to: determine emotion values of one or more emotion catalogs at one or more time points of a content; and determine one or more interruption points based on the determined emotion values.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
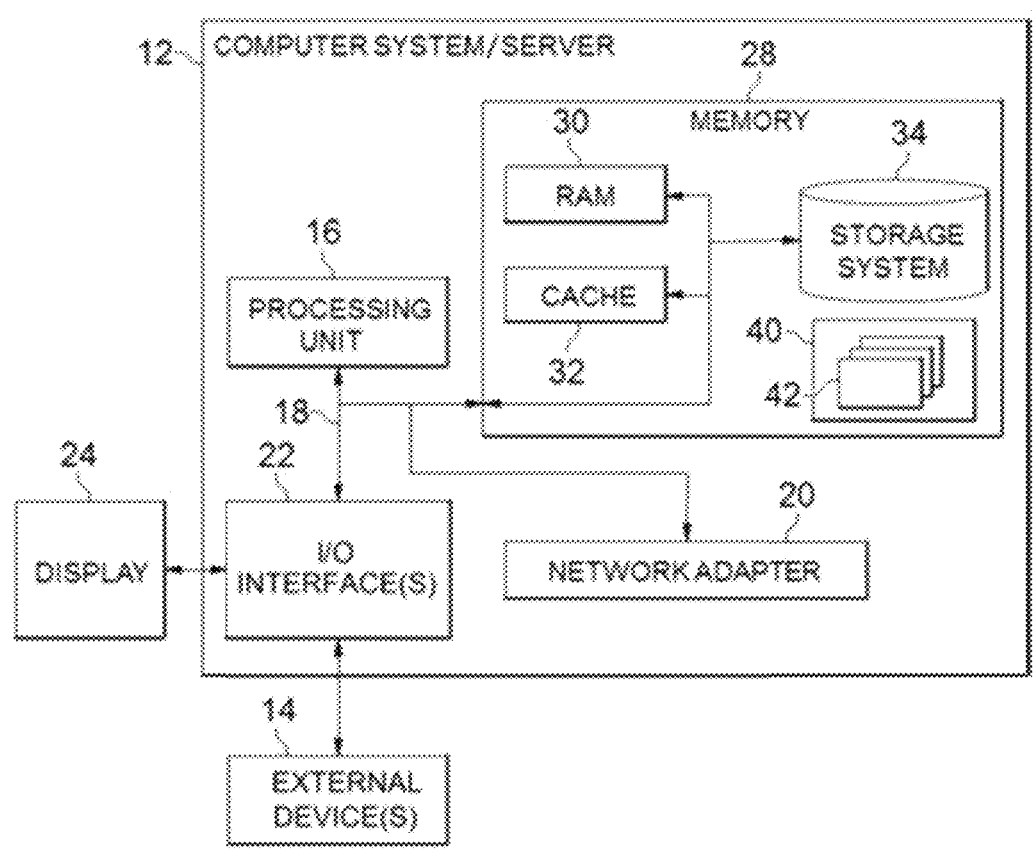
FIG. 1 depicts a cloud computing node according to an embodiment of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
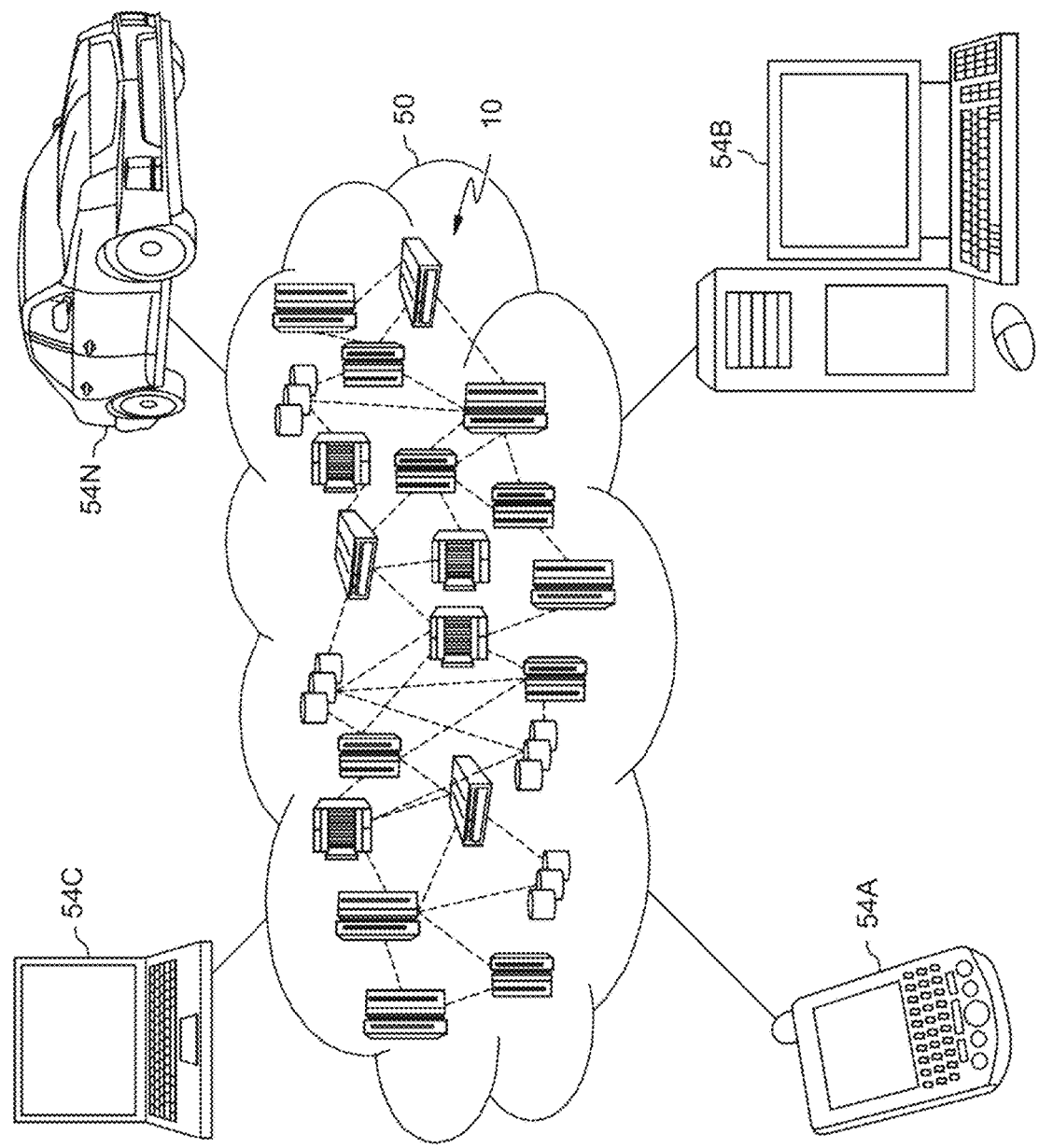
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
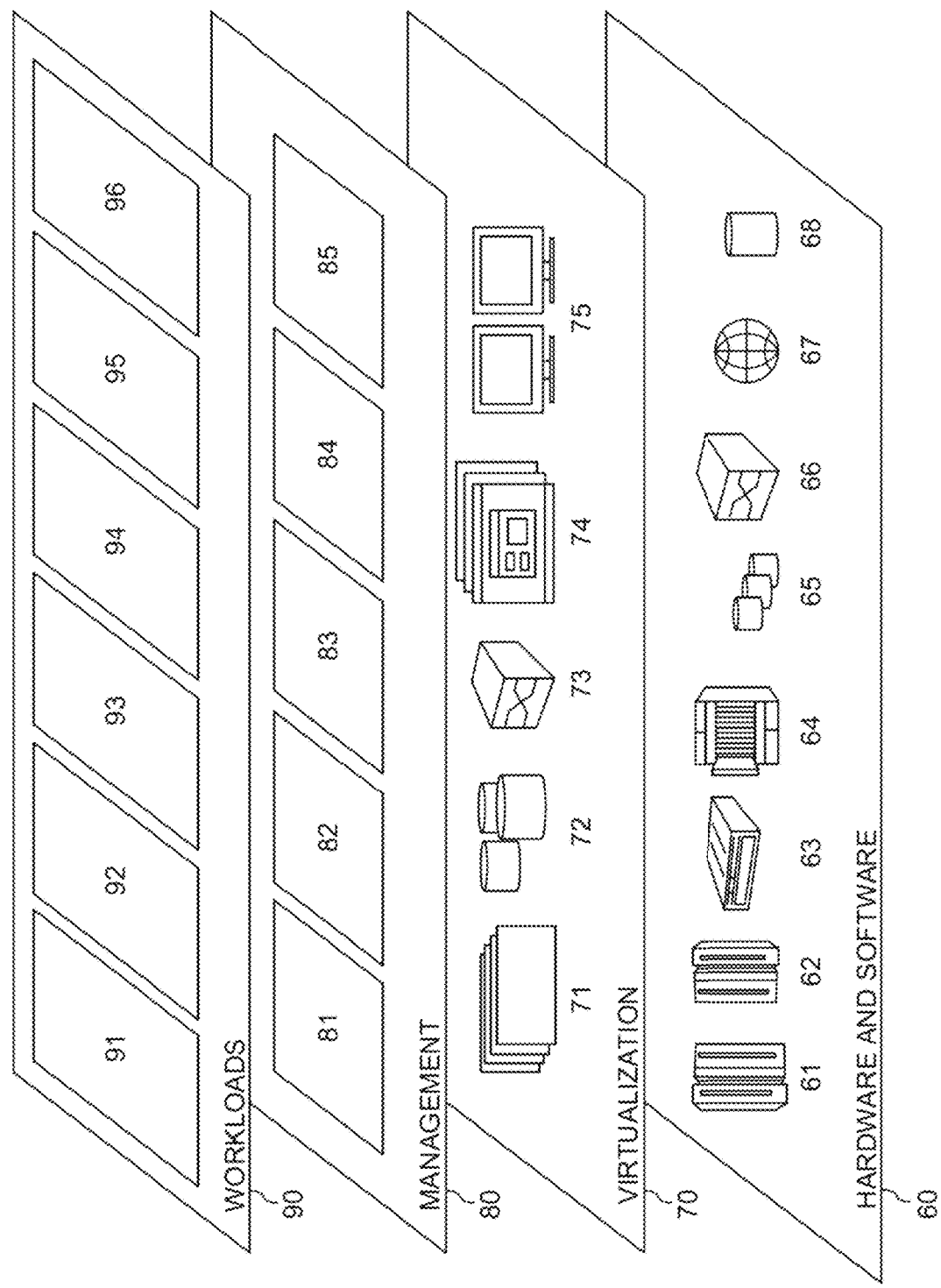
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and interruption point determination 96.

Nowadays, many different content providers are providing different types of content viewing service to users. The content providers can be video websites, live streaming platforms, video sharing platforms, video on demand platforms, television stations, and radio stations, etc. The contents provided to users can be video contents, audio contents, stream media, movies, television programs, TV plays, cartoons, and live shows, etc. When the contents are viewed by the users, the contents can be interrupted and another content can be inserted and shown to the users at interruption points. For example, if a user selects a video on a video website, the video can be shown to the user. When the video is viewed by the user, the video can be interrupted at interruption points, and an advertisement can be inserted and shown to the user.

According to embodiments of the present invention, another content inserted at the interruption points can be an advertisement, a music, an interaction for the users, questionnaire to the users, etc. In some embodiments of the present invention, advertisements may be used as example inserted contents. However, it shall be understood that any other type of content now known or to be developed can be inserted at the interruption points.

To solve the problem of determining interruption points, embodiments of the present invention provide a method, a computer system and a computer program product for determining interruption points for a content based on emotion values of a content. According to embodiments of the invention, the emotion values can be number values, or any other types of measurements. For example, the emotion values can be indicators, which can be used to represent degrees of the emotions, such as high, medium, or low, etc.

Interruption points can be pre-defined. For example, some content providers may decide to insert an advertisement when a user begins to view a content or at pre-defined static time points during the content being viewed by the user. However, these pre-defined static time points may not be good, as they are not set based on emotion impulses to the content being viewed by the users.

Figure 4:
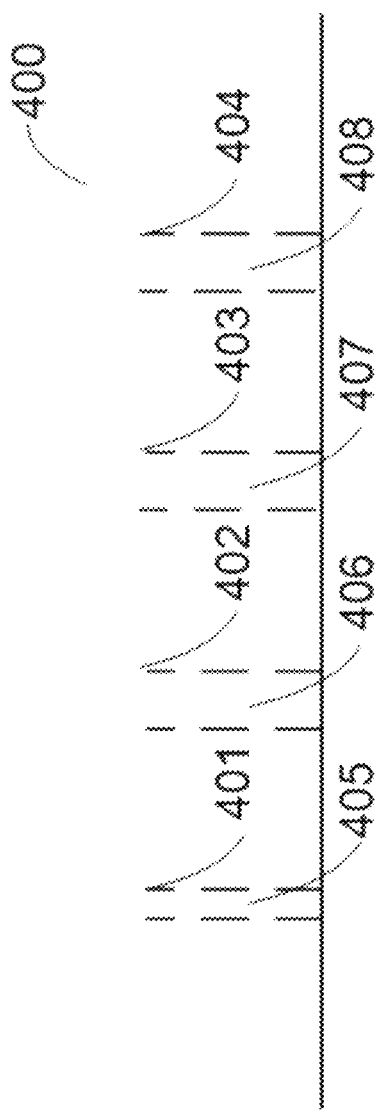
FIG. 4 depicts an example content provided to users by a content provider according to an embodiment of the present invention.

With reference now to FIG. 4, an exemplary content 400 provided to users by a content provider is shown. In an example, the content can be a video. However, it shall be understood that the content can be any type of content now known or to be developed. The content 400 can comprise slides, voices, audios, background music, captions, etc. The content 400 may also comprise or correspond to a timeline, which can be used to indicate the play progress of the content 400. Multiple time points can be determined on the timeline, such as time points 401, 402, 403, and 404, etc. The time points 401, 402, 403, and 404 can be any time on the timeline for the content 400. The intervals between the time points 401, 402, 403, and 404 can be any length needed. In an example, the time point 401 is "00:30:00", which is 30th minute after the start time point of the content; the time point 402 is "00:45:00", which is 45th minute after the start time point of the content; the time point 403 is "01:00:00", which is 1st hour after the start time point of the content; and the time point 404 is "01:15:00", which is 1st hour and 15th minute after the start time point of the content. According to embodiments of the present invention, the time points can be determined or defined by the content providers or advertisers before or during the content 400 being provided to the users. For example, the content providers or advertisers can set or select time points 401, 402, 403, and 404 from the timeline for the content 400.

According to embodiments of the invention, emotion values of one or more emotion catalogs at the time points 401, 402, 403, and 404 can be determined. For example, emotion values can be used to represent measurements or degrees of one or more emotion catalogs at a specific time point of the content. One or more of the time points 401, 402, 403, and 404 can be set or selected as interruption point based on the determined emotion values. For example, if the emotion values at the time point 402 meets the requirement of a predefined criterion, the time point 402 can be set or selected as an interruption point.

According to embodiments of the present invention, the emotion values can be values of different emotion catalogs. For example, the emotion catalogs can comprise one or more of joy, anger, disgust, fear, and sadness, etc. In an example, the emotion catalogs comprise five catalogs including anger, disgust, fear, joy, and sadness. It is to be understood that any other emotion catalogs now known or to be developed can also be applied.

According to embodiments of the present invention, the emotion values at time points 401, 402, 403, and 404 can be determined using emotion recognition technologies. The emotion recognition technologies can comprise text emotion analysis technology, soundtrack emotion analysis technology, facial expression emotion analysis technology, etc. In an example, natural language processing system can also be used to obtain emotion values. It is to be understood that any other emotion recognition technology now known or to be developed can also be applied. Many existing emotion cognition systems can be applied to determine emotion values.

According to embodiments of the present invention, the content 400 can be analyzed to determine emotion influential sources, which include one or more of the following: captions, facial expressions of actors/actress, background music volumes, background music tones, voice volumes, and voice tones at the time points. It is to be understood that the content can comprise any other type of emotion influential sources now known or to be developed.

According to embodiments of the present invention, the emotion influential sources can be selected to determine the emotion values. For example, voice volumes at the time points 401, 402, 403, and 404 can be determined, and then emotion values can be determined based on the voice volumes. If the voice volumes are larger than a preset threshold, the emotion values of anger or joy can be set larger than 0.5 or "high". In another example, the voice volumes can also be used as emotion values of anger or joy. In another example, facial expressions of actors/actress at the time points 401, 402, 403, and 404 can be recognized using facial expressions recognition technology, and then emotion values can be determined based on the facial expressions. In an example, captions at the time points 401, 402, 403, and 404 can be determined. Emotion values can be determined based on the captions using natural language processing technologies.

According to embodiments of the present invention, one or more types of the emotion influential sources can be selected based on the type of the content 400 to determine the emotion values. The type of the content 400 can be recognized by the category defined by the author of the content 400 or the keywords appeared in the description of the content 400. Other cognition technologies can also be used to determine the type of the content 400. For example, if the content 400 is detected to be a speech type video, both voice tones and voice volumes can be selected to determine the emotion values. In another example, if the content 400 is detected to be a musical concert video, both background music volume and background music tone can be selected to obtain the emotion values.

According to embodiments of the present invention, the emotion influential sources can be assigned priorities and/or weight according to the type of the content 400. For example, if the content 400 is detected to be a speech-type video, both voice tones and voice volumes can be analyzed with higher priority or weight to determine the emotion values. The emotion values can be determined only based on both the voice tones and the voice volumes. In another example, if the content 400 is detected to be a musical concert video, both background music volume and background music tone can be analyzed with higher priority or weight to determine the emotion values. In some examples, the video type can be recognized and then one or more emotion sources can be selected and/or assigned with different priorities or weights to be used in the emotion values determination based on the video type.

According to embodiments of the present invention, content sections, such as 405, 406, 407 and 408 of preset time lengths before the time points 401, 402, 403, and 404 can be obtained. The time lengths can be set by the content providers, advertisers, or the users. For example, the time point 401 can be 30th minute in the timeline (00:30:00) of the content, a preset time length can be 1 minute, and the content section 405 is a content section between 29th (00:29:00) and 30th minute (00:30:00) on the timeline. In another example, the time point 402 can be 1st hour in the timeline (01:00:00) of the content, a preset time length can be 2 minutes, and the content section 106 is a content section between 58th minute (00:58:00) and 1st hour (01:00:00) on the timeline. The emotion influential sources, such as captions, facial expressions of actors/actress, background music volume, background music tone, voice volume, and voice tone, of each section 405, 406, 407 and 408 can be analyzed to determine emotion values at the time points 401, 402, 403, and 404. For example, captions of section 405 can be determined. Emotion values at time point 401 can be determined based on the captions of section 405.

The emotion values can be normalized to be values between 0 and 1. Table 1 shows an example of normalized emotion values determined at multiple time points 401, 402, 403, and 404. In Table 1, the emotion values at the time point 401 "00:30:00" are "Anger 0.87; Disgust 0.17; Fear 0.09; Joy 0.00; Sadness 0.13"; the emotion values at the time point 402 "00:45:00" are "Anger 0.58; Disgust 0.47; Fear 0.55; Joy 0.64; Sadness 0.19"; the emotion values at the time point 403 "01:00:00" are "Anger 0.38; Disgust 0.26; Fear 0.09; Joy 0.10; Sadness 0.36"; and the emotion values at the time point 404 "01:15:00" are "Anger 0.32; Disgust 0.06; Fear 0.61; Joy 0.08; Sadness 0.08". As a further example, a normalized emotion value of an emotion catalog may be used to represent the occurrence possibility of the corresponding emotion in the content. For example, if the emotion value of "Anger" is 0.87, that means at the time point "00:30:00", the emotion "Anger" is very likely (87% probability) to occur in the content.

TABLE 1

Emotion Values at Multiple Time Points

| Time Point | Anger | Disgust | Fear | Joy | Sadness |
| --- | --- | --- | --- | --- | --- |
| Time Point 401 | 0.87 | 0.17 | 0.09 | 0.00 | 0.13 |
| Time Point 402 | 0.58 | 0.47 | 0.55 | 0.64 | 0.19 |
| Time Point 403 | 0.38 | 0.26 | 0.09 | 0.10 | 0.36 |
| Time Point 404 | 0.32 | 0.06 | 0.61 | 0.08 | 0.08 |

According to embodiments of the present invention, interruption points can be determined based on the emotion values.

The criteria can be predetermined by the content providers, the users, the advertisers, or any other parties. The criteria can also be generated based on the emotion values determined by analyzing the content 400. The criteria can also be predetermined by analyzing the behaviors of the users. For example, the users can report their preferred emotion value ranges, so time points with emotion values in the preferred emotion value ranges can be set as interruption points.

According to embodiments of the present invention, the criteria can comprise a requirement for the emotion values.

In some embodiments, the time point with the lowest or highest emotion values of one or more emotion catalogs can be set as an interruption point. In this example, the criteria can be "Joy of the Viewed Content: Lowest", which means the time point with the lowest emotion value of catalog "Joy" can be set as an interruption point.

In other embodiments, the criteria can comprise one or more emotion value ranges. If a value of a time point meets a predetermined emotion value range, the time point can be set as an interruption point.

For example, a criterion can be "Joy of the Viewed Content: lower than 0.5", which means if the emotion value of catalog "Joy" of the viewed content at a time point is lower than 0.5, the corresponding time point can be selected as an interruption point. In another example, another criterion can be "Anger of the Viewed Content: lower than 0.5; Joy of the Viewed Content: lower than 0.5", which means if the emotion values of catalog "Anger" and "Joy" of the viewed content at a time point are both lower than 0.5, the corresponding time point can be selected as an interruption point for insertion. In this example, time point 403 and 404 can be selected as interruption points. In a further example, another criterion can be "Anger of the Viewed Content: Low; Joy of the Viewed Content: Low", which means if the emotion values of catalog "Anger" and "Joy" of the viewed content at a time point are both "Low", the corresponding time point can be selected as an interruption point.

According to embodiments of the present invention, the criteria may also comprise a number of times for insertion, and/or an insertion period.

For example, the number of times for insertion can be used in determining the interruption points. In an example, the content providers, advertisers, or users can set a preset number as the times for insertion. The number of times can be determined based on the length of the content 400. For example, the number of times can be 1 if the content 400 is shorter than 1 hour, or 2 if the content 400 is longer than 1 hour and shorter than 2 hours, etc. In an example, the predetermined criterion comprising an emotion value range and a number of times for insertion can be "Joy of the Viewed Content: lower than 0.5; Number of Times: 1". Based on the criterion, a time point with the emotion value complying with the emotion value range (Joy: lower than 0.5) can be selected as an interruption point. The selected time point can be the time point with the lowest emotion values complying with the emotion value range.

In another example, the criterion can be "Anger of the Viewed Content: lower than 0.5; Joy of Viewed Content: lower than 0.5; Number of Times: 2". According to this criterion, two time points with emotion values complying with the emotion value range (Anger: lower than 0.5; Joy: lower than 0.5) can be selected as an interruption point. In a further example, the selected two time points can be the ones with the lowest and the second lowest emotion values complying with the emotion value range.

According to embodiments of the present invention, one or more insertion periods can also be used in the determining interruption points. For example, the content providers, advertisers or users can set an insertion time period. In an example, the insertion period can be from 30th minute to 1st hour, which means the inserted content should be inserted between 30th minute and 1st hour at the timeline of the content. In this example, the criterion can be "Anger of the Viewed Content: lower than 0.5; Joy of the Viewed Content: lower than 0.5; Time Periods: 00:30:00 to 01:00:00. Based on the criterion, a time point with the emotion value complying with the emotion value range (Anger: lower than 0.5; Joy: lower than 0.5) between 30th minute and 1st hour can be selected as an interruption point. It shall be understood that any period can be set as the insertion period in the criterion.

According to embodiments of the present invention, the criteria may also comprise a requirement for emotion value, an insertion period, and a number of times for insertion in the insertion period. For example, a criterion can be "Anger of the Viewed Content: lower than 0.5; Joy of the Viewed Content: lower than 0.5; Time Period 1: 00:30:00 to 01:00:00; Number of Times for Time Period 1:1". According to this criterion, a time point with an emotion value complying the emotion value range (Anger: lower than 0.5; Joy: lower than 0.5) during the time period 1 (00:30:00 to 01:00:00) can be selected as an interruption point.

According to embodiments of the present invention, one or more interruption points can be determined and the content provider or advertisers can choose one or more of the multiple interruption points for inserting another content, such as an advertisement.

According to embodiments of the present invention, lengths and/or types (emotion type or content type) of the contents to be inserted at the interruption points can also be determined. In an example, length and/or type (emotion type or content type) of an inserted content can be determined based on the emotion values and/or emotion catalogs of the viewed content at the interruption point (the time point being set as an interruption point). Other methods can also be used to determine the length and/or type of the inserted content.

In an example, the emotion type of the content to be inserted can be the emotion catalog of which the emotion value is the largest. For example, if the emotion values of the inserted content are "Anger 0.28; Disgust 0.27; Fear 0.15; Joy 0.64; Sadness 0.19", the emotion type of the inserted content can be defined as "Joy". The content type of the inserted content defines classification to the inserted content. In an example, the content type of the inserted content can comprise: advertisement, music, interaction for the users, questionnaire to the users, etc. In a further example, an inserted content (advertisement) can be classified based on the type of promoted commodity of the inserted content, such as "car", "food", "cloth", etc. The content type of the inserted content can be defined according to the type of promoted commodity.

In an example, one or more length and/or type determination conditions can also be predefined to determine the lengths and/or types of the contents to be inserted. The length and/or type determination conditions can comprise a mapping of length and/or type of the content to be inserted and emotion values and/or emotion types of the viewed content at the interruption point.

For example, a length and/or type determination condition can be "Length of the Inserted Content: 1 minute; Joy of the viewed content: lower than 0.3", which means if the emotion value of catalog "Joy" of the viewed content at the interruption point is lower than 0.3, the corresponding length of inserted content can be 1 minute. In another example, a preset condition can be "Emotion Type of the Inserted Content: Joy; Joy of the viewed content: larger than 0.3", which means if the emotion value of catalog "Joy" of the viewed content at the interruption point is larger than 0.3, the corresponding emotion type of the inserted content can be "Joy".

In another example, another length and/or type determination condition can be "Emotion Type of the Inserted Content: Joy; Length of the Inserted Content: 1 minute; Joy of the viewed content: larger than 0.5", which means if the emotion value of catalog "Joy" of the viewed content at the interruption point is larger than 0.5, an inserted content being 1 minute long and with an emotion type as "Joy" can be inserted at the interruption point. Another example length and/or type determination condition can be "Emotion Type of the Inserted Content: Joy; Length of the Inserted Content: 15 seconds; Sadness of the Viewed Content: lower than 0.3", which means if the emotion value of catalog "Sadness" of the viewed content at the interruption point is smaller than 0.3, an inserted content being 15 seconds long and with an emotion type as "Joy" can be inserted at the interruption point.

In a further example, the length and/or type determination condition can be "Emotion Type of the Inserted Content: Joy; Content Type of the Inserted Content: Food; Length of the Inserted Content: 1 minute; Joy of the viewed content: larger than 0.5", which means if the emotion value of catalog "Joy" of the viewed content at the interruption point is larger than 0.5, an inserted content being 1 minute long and with an emotion type as "Joy" and a content type "food" can be inserted at the interruption point.

The present invention does not limit the criteria and/or conditions in the scope of the above-mentioned examples, it shall be understood that other type or format of criterion and/or conditions can be applied if needed. These criteria and/or conditions can be updated based on business/marketing decision of content providers or advertisers. These criteria and/or conditions can also be updated based on feedback of users. The content providers, advertisers, or users can also configure the criteria and/or conditions based on the emotion values.

According to embodiments of the present invention, feedbacks from users can be collected and used for adjusting the criteria for interruption point determination and/or the criteria for length determination. For example, options, such as "like", "no concern" and "dislike", can be shown on a user interface in parallel with the inserted content. The user can select one of the options according to his/her feeling to the inserted content. The ratio of "no concern" or "dislike" for the inserted content can be calculated according to the number of received selection times of "dislike" from users. For example, if an inserted content has been shown to 1,000 people, and 500 people have selected "dislike", the ratio of "dislike" for the inserted content can be 50%. If the number of received selection times of "dislike" or the ratio of "dislike" is higher than a threshold predefined, such as 500 times or 50%, the interruption points corresponding to the options can be canceled and the criteria for interruption point determination can also be updated. In an example, the criteria "Joy of the Viewed Content: lower than 0.3" or "Anger of the Viewed Content: lower than 0.3; Joy of the Viewed Content: lower than 0.3" can be updated to "Joy of the Viewed Content: lower than 0.2" or "Anger of the Viewed Content: lower than 0.2; Joy of the Viewed Content: lower than 0.2". Then, interruption points can be determined according to the updated criteria.

In another example, if the number of received selection times of "dislike" or the ratio of "dislike" is higher than a predefined threshold, the length of the inserted content can be decreased. For example, the criterion for length determination "Length of the Inserted Content: 1 minute; Joy of the Viewed Content: lower than 0.3" can be updated to "Length of the Inserted Content: 45 seconds; Joy of the Viewed Content: lower than 0.3".

In another example, if the number of received selection times of "dislike" or the ratio of "dislike" is higher than a predefined threshold, the type (emotion type or content type) of the inserted content can be updated.

According to the embodiments of the present invention, the content 400 can be a streamed video. The processing for the streamed video is similar to the processing for a pre-recorded video.

Figure 5:
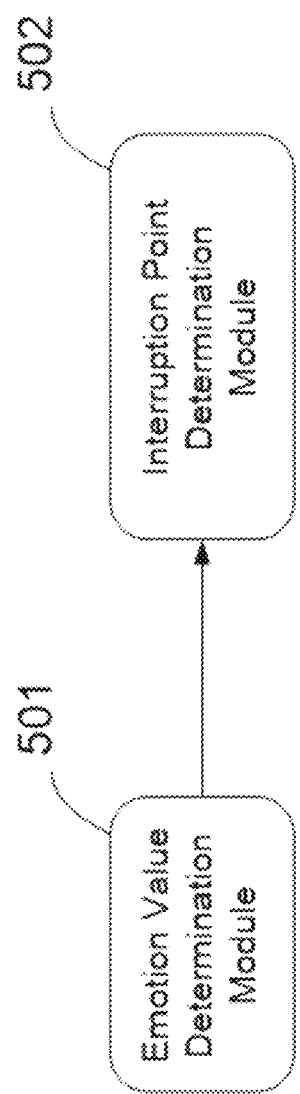
FIG. 5 depicts a block diagram of an example system for determining interruption points according to an embodiment of the present invention.

FIG. 5 depicts a block diagram of an example system 500 for determining interruption points according to embodiments of the present invention. The system 500 can be implemented as or comprised in a computer system at the user side, or a server at the content provider side, or any other device suitable to implement the methods of the present invention. The system 500 comprises emotion value determination module 501, and interruption point determination module 502. Emotion value determination module 501 can be configured to determine emotion values of one or more emotion catalogs at multiple time points for a content. Interruption point determination module 502 can be configured to determine interruption points based on the emotion values. It shall be understood that the system 500 is only for illustration. Modules 501 and 502 can be divided to multiple modules or combined to be one or more modules. Other modules for implementing one or more steps of the processing according to embodiments of the present invention can also be added or associated to modules 501 and 502.

Figure 6:
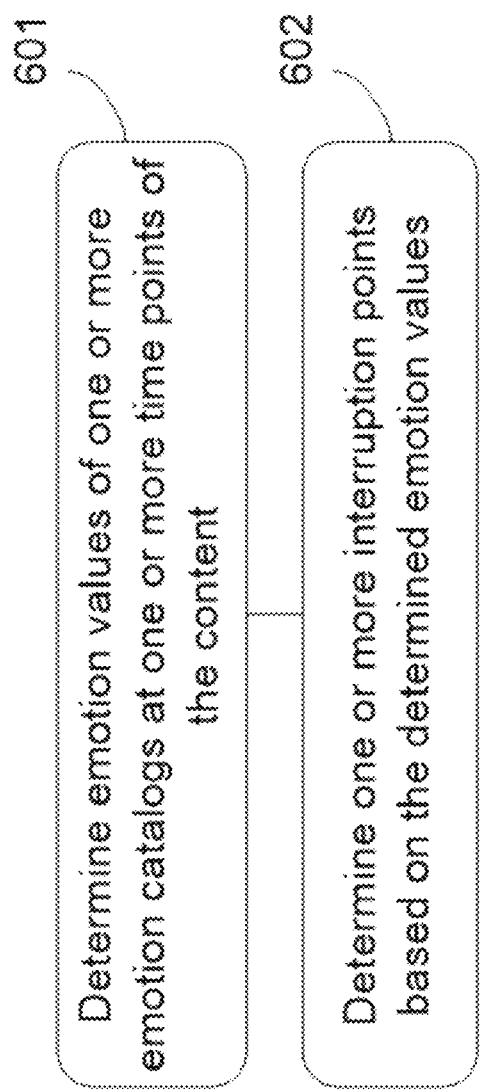
FIG. 6 depicts a flowchart of an example method for determining interruption points according to an embodiment of the present invention.

FIG. 6 depicts a flowchart of an example method 600 for determining interruption points according to an embodiment of the present disclosure. According to various embodiments of the present disclosure, the method 600 can be implemented by a computer device, a server, or any other type of computing device. The method 600 can be implemented for determining interruption points based on emotion values of a content viewed by a user.

At step 601, emotion values of one or more emotion catalogs at one or more time points of the content can be determined. At step 602, one or more interruption points can be determined based on the determined emotion values.

According to embodiments of the present invention, there is provided a computer system for determining interruption points based on emotion values in the content. The system comprises one or more processors, a memory coupled to at least one of the one or more processors and a set of computer program instructions stored in the memory and executed by at least one of the one or more processors to perform some actions described in the above methods.

According to embodiments of the present invention, there is provided a computer program product for determining interruption points based on emotion values in the content. The computer program product comprises a computer readable storage medium having program instructions embodied therewith, the program instructions executable by a processor to cause the processor to perform some actions described in the above methods.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   determining emotion values of one or more emotion catalogs at one or more time points of a content, wherein determining the emotion values of the one or more emotion catalogs comprises;
      determining emotion influential sources at the one or more time points of the content, wherein the emotion influential sources comprise captions, background music tones, and voice tones;
      determining the emotion values of the one or more emotion catalogs at the one or more time points by analyzing the determined emotion influential sources; and
   determining one or more interruption points based on the determined emotion values, wherein music, a user interaction, or a questionnaire to the user is inserted at the one or more interruption points.

2. The method according to claim 1, wherein determining the one or more interruption points comprises:
   in response to a first emotion value at a first time point meeting a predetermined criterion, setting the first time point as an interruption point.

3. The method according to claim 2, wherein the predetermined criterion is modified based on at least one feedback from at least one user.

4. The method according to claim 3, wherein the predetermined criterion comprises a requirement for the emotion values.

5. The method according to claim 4, wherein the predetermined criterion further comprises an insertion period and a number of times for insertion.

6. The method according to claim 1, further comprising:
   determining a length and a type of another content inserted at the one or more interruption points.

7. The method according to claim 1, wherein the one or more emotion catalogs are selected from a group consisting of anger, disgust, fear, joy, and sadness.

8. The method according to claim 1, wherein the emotion influential sources are assigned with priorities or weight according to a content type.

9. A computer system, comprising:
   one or more processors, one or more computer-readable memories, one or more computer-readable non-transitory tangible storage media, and program instructions stored on at least one of the one or more tangible storage media for execution by at least one of the one or more processors via at least one of the one or more memories, wherein the computer system is capable of performing a method comprising:
   determining emotion values of one or more emotion catalogs at one or more time points of a content, wherein determining the emotion values of the one or more emotion catalogs comprises;
      determining emotion influential sources at the one or more time points of the content, wherein the emotion influential sources comprise captions, background music tones, and voice tones;
      determining the emotion values of the one or more emotion catalogs at the one or more time points by analyzing the determined emotion influential sources; and
   determining one or more interruption points based on the determined emotion values, wherein music, a user interaction, or a questionnaire to the user is inserted at the one or more interruption points.

10. The computer system according to claim 9, wherein determining the one or more interruption points comprises:
    in response to a first emotion value at a first time point meeting a predetermined criterion, setting the first time point as an interruption point.

11. The computer system according to claim 10, wherein the predetermined criterion is modified based on at least one feedback from at least one user.

12. The computer system according to claim 10, wherein the predetermined criterion comprises a requirement for the emotion values.

13. The computer system according to claim 12, wherein the predetermined criterion further comprises an insertion period and a number of times for insertion.

14. The computer system according to claim 11, further comprising:
    determining a length and a type of another content inserted at the one or more interruption point.

15. A computer program product, comprising:
    one or more computer-readable non-transitory tangible storage media and program instructions stored on at least one of the one or more tangible storage media, the program instructions executable by a processor of a computer to perform a method, the method comprising:
    determining emotion values of one or more emotion catalogs at one or more time points of a content, wherein determining the emotion values of the one or more emotion catalogs comprises;
       determining emotion influential sources at the one or more time points of the content, wherein the emotion influential sources comprise captions, background music tones, and voice tones;

determining the emotion values of the one or more emotion catalogs at the one or more time points by analyzing the determined emotion influential sources; and determining one or more interruption points based on the determined emotion values, wherein music, a user interaction, or a questionnaire to the user is inserted at the one or more interruption points.

16. The computer program product according to claim 15, wherein determining the one or more interruption points comprises:

in response to a first emotion value at a first time point meeting a predetermined criterion, setting the first time point as an interruption point.

* * * * *